United States Patent [19]

Wilmot et al.

[11] 4,396,355
[45] Aug. 2, 1983

[54] EJECTOR

[75] Inventors: Charles K. S. Wilmot, Wallingford; Claude L. Stockwell, Newbury; Victor R. Phillips, Didcot, all of England

[73] Assignee: United Kingdom Atomic Energy Authority, London, England

[21] Appl. No.: 226,131

[22] Filed: Jan. 19, 1981

[30] Foreign Application Priority Data

Jan. 28, 1980 [GB] United Kingdom ................ 8002876

[51] Int. Cl.³ ............................................. F04F 5/46
[52] U.S. Cl. .................................... 417/160; 417/180; 417/183; 417/196; 417/900
[58] Field of Search ................ 417/76, 160, 167, 168, 417/169, 151, 198, 179, 180, 900; 239/112, 113

[56] References Cited

U.S. PATENT DOCUMENTS

| 344,475 | 6/1886 | Cheney | 417/180 |
| 1,583,090 | 5/1926 | Ostermann | 417/167 |
| 1,875,754 | 9/1932 | Nelson | 417/180 |
| 2,673,125 | 3/1954 | Squire | 417/179 X |
| 3,694,107 | 9/1972 | Stein | 417/169 X |
| 4,184,806 | 1/1980 | Prinz | 417/160 |

FOREIGN PATENT DOCUMENTS

| 319820 | 6/1923 | United Kingdom . |
| 774624 | 1/1956 | United Kingdom . |
| 910188 | 2/1960 | United Kingdom . |
| 1235727 | 9/1968 | United Kingdom . |
| 1285178 | 8/1969 | United Kingdom . |
| 1548137 | 3/1978 | United Kingdom . |

Primary Examiner—Edward K. Look
Attorney, Agent, or Firm—Larson and Taylor

[57] ABSTRACT

An ejector 110 having an additional nozzle 173 for issuing a fluid at a relatively high pressure through a throat 113 of the ejector 110 into an outlet 114 from the throat 113, so as to clear any material lodging in the outlet 114 and/or the throat 113. The additional nozzle 113 may be co-axial with the main nozzle 140 of the ejector 110, or angularly disposed from it.

3 Claims, 7 Drawing Figures

EJECTOR

This invention relates to an ejector (or jet pump) and to a method of operation thereof, and more particularly to an ejector for displacing a slurry.

According to one aspect of the present invention, in an ejector having a first nozzle for the issuance of a fluid through a throat portion of the ejector into an outlet from the throat portion so as to eject from the outlet a slurry in the throat portion, there is provided a second nozzle for the issuance of a fluid through said throat portion at said outlet so as to break up and/or dislodge any material from the slurry lodging in the outlet and/or the said throat portion.

In another aspect there is provided a method of using an ejector for discharging a slurry from a reservoir connected to the ejector, by issuing a fluid from a first nozzle of the ejector across a throat portion thereof into an outlet from the throat portion, the method including intermittently issuing a fluid from a second nozzle of the ejector across the throat portion to the outlet at a substantially higher pressure than the pressure of the fluid issued by the first nozzle, so as to break up and/or dislodge any material from the slurry lodging in the outlet and/or the throat portion.

The fluid to be issued from the second nozzle may be different from the fluid to be issued from the first nozzle, and may comprise a liquid. The second nozzle may be used intermittently in parallel with the first nozzle, or alternately therewith, and may be co-axial with the first nozzle, or be angularly displaced therefrom.

The invention will now be further described by way of example only with reference to the accompanying drawings, in which.

Figure 1:
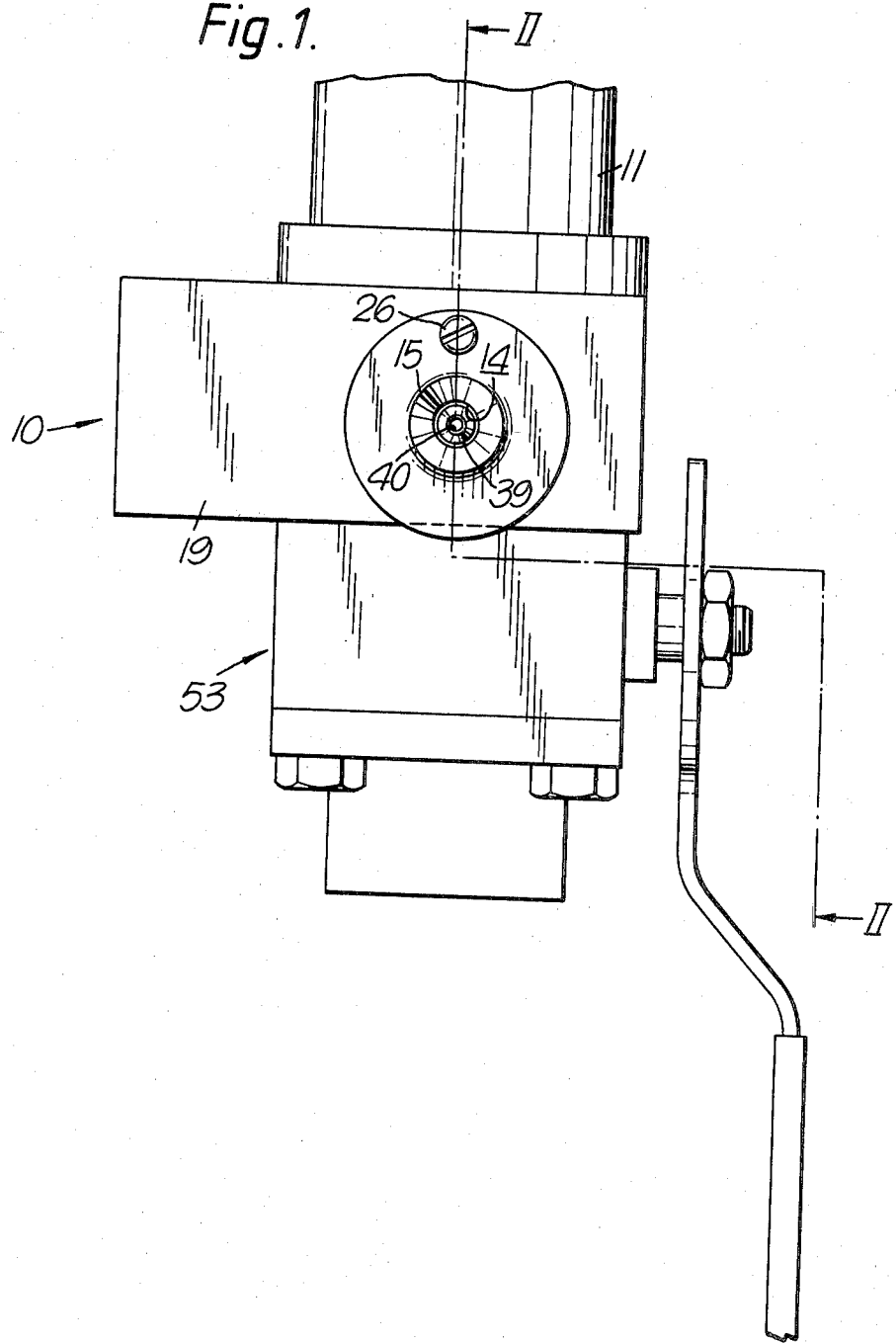
FIG. 1 shows a side view of an ejector.
Figure 2:
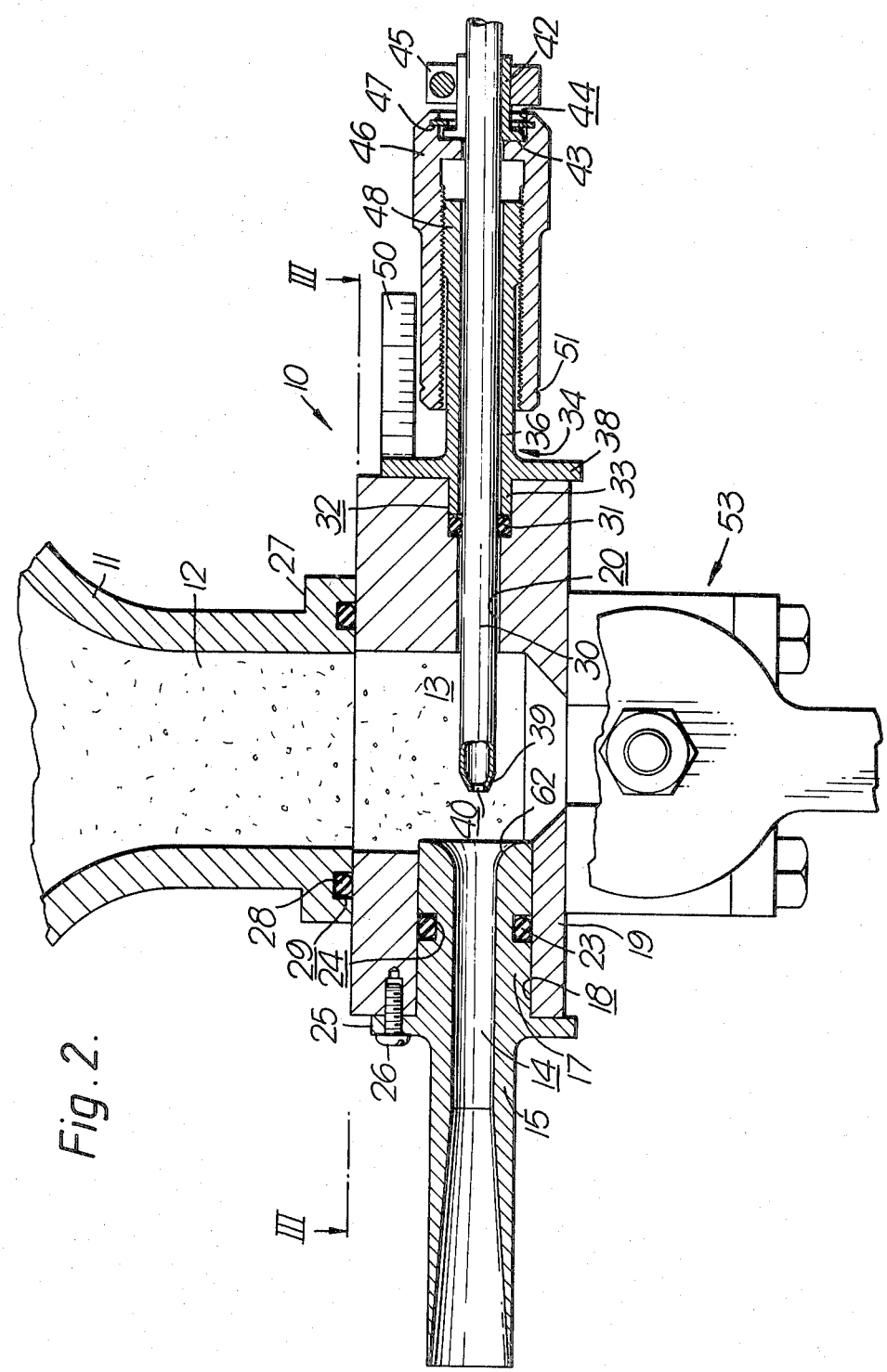
FIG. 2 shows a sectional view on the line II—II of FIG. 1.

Referring now to FIGS. 1 and 2, an ejector 10 is shown connected to a reservoir 11 for the downward feed of a slurry 12 into a throat 13 of the ejector 10. The throat 13 connects with a radially directed outlet bore 14 defined by a body 15 which is generally circular in transverse section and has a cylindrical spigot 17 located in a cylindrical hole 18 defined by a housing 19 of the ejector 10. An 'O' ring seal 23 is located in an annular groove 24 of the spigot portion 17, and a flange 25 of the body 15 is secured to the housing 19 by screws 26 (only one is shown) to retain the body 15 in the housing 19. The reservoir 11 has a flange 27 which is secured by screws (not shown) to the housing 19, a seal therebetween being provided by an 'O' ring seal 28 in an annular groove 29 in the flange 27.

A main jet 30 of tubular form extends radially through a cylindrical hole 20 in the housing 19 co-axially with the cylindrical hole 18, and is sealed by an 'O' ring seal 31 through which the main jet 30 extends. The 'O' ring seal 31 locates at its periphery with the housing 19 in a recess 32 and is retained therein by a ferrule 33 of a stem portion 36 of a micrometer adjustment device 34, the stem portion 36 having a flange 38 secured to the housing 19 by screws (not shown). The main jet 30 has a convergent end 39 which defines a nozzle or orifice 40 therethrough.

A bush 42 about the main jet 30 and split longitudinally is clamped thereon by a split clamp ring 45. The bush 42 has a shoulder 43 in a circular recess 44 in an internally threaded barrel portion 46 and is retained therein by a circlip 47, the barrel portion 46 locating on an externally threaded portion 48 of the stem portion 36. A scale 50 extends from the flange 38 over part of the length of the barrel portion 46, and a fiducial peripheral groove 51 in the barrel portion 46 provides a reference to enable the relative axial position of the barrel portion 46 and thus of the main jet 30 to be determined. A ball drain valve 52 is secured to the housing 19 below the throat 13.

Figure 3:
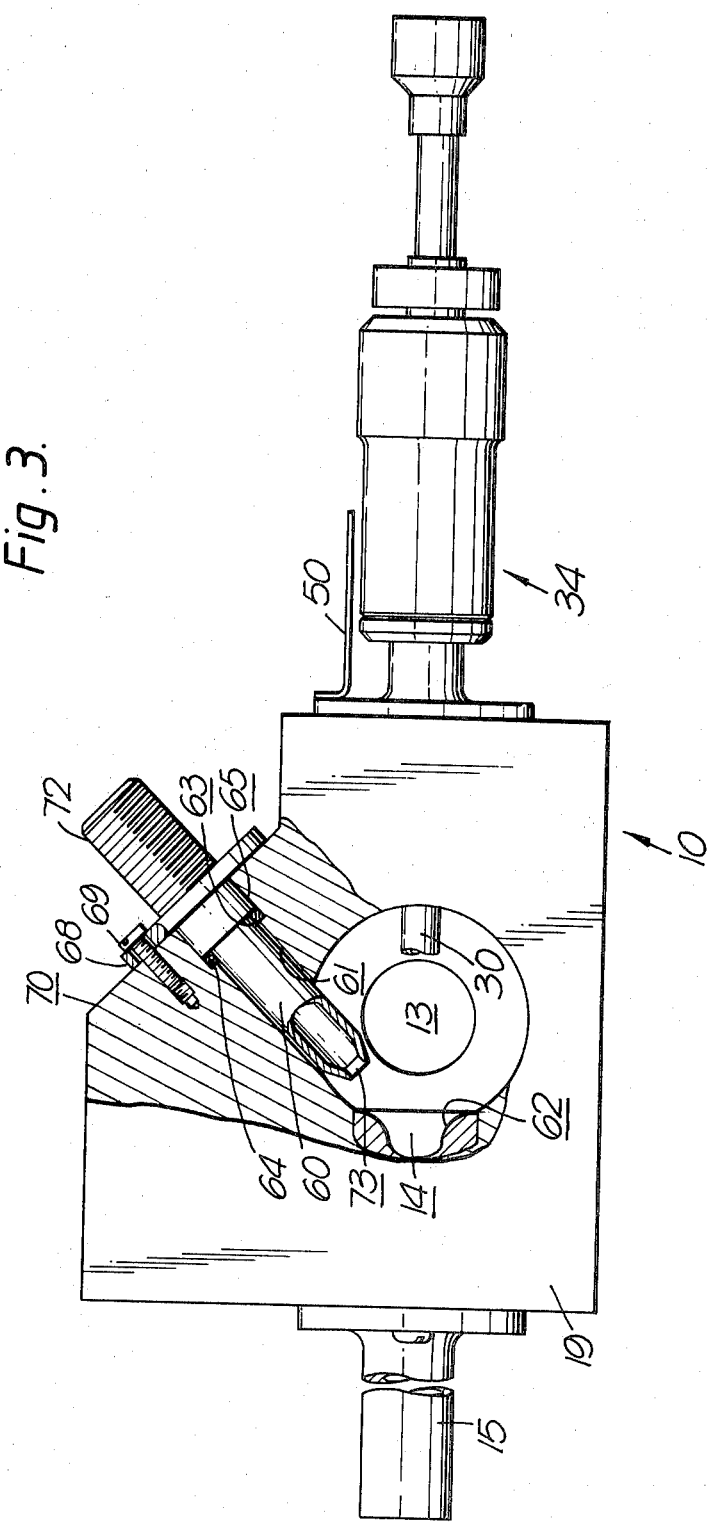
FIG. 3 shows a sectional view on the line III—III of FIG. 2.

Referring now to FIG. 3, a secondary jet tube 60 extends obliquely through a cylindrical hole 61 in the housing 19 into the throat 13 in line with a flared inlet 62 of the outlet bore 14, and has an annular groove 63 in which an 'O' ring seal 64 locates in sealing engagement with the housing 19 in a recess 65 therein. A flange 68 of the secondary jet tube 60 is secured by screws 69 (only one is shown) to an inclined face 70 of the housing 19, and an externally threaded spigot portion 72 of the secondary jet tube 60 extends outwardly from the flange 68. The other end of the secondary jet tube 60 is convergent to define a nozzle or orifice 73 therethrough.

In use of the ejector 10, clear fluid (e.g. water, aqueous ammonia solution, or alcohol) is ejected at a low pressure of about 10 to 20 psi from the main jet 30 through the orifice 40 into the inlet 62 of the outlet bore 14 and entrains some of the slurry 12 from the reservoir 11 as the fluid passes through the throat 13. In the event of material from the slurry 12 lodging in the flared inlet 62, or between the flared inlet 62 and the main jet 30, clear liquid (e.g. water) is fed at a high pressure (e.g. 2000 psi) through the orifice 73 of the secondary jet 60 at the flared inlet 62 to break up and/or dislodge this material. The material blocking the outlet bore 14 might be as a result of mis-shaped particles in the slurry 12, for example "spaghetti" instead of spheres, oversize particles, or an accretion of particles from the slurry 12.

The slurry 12 may comprise gel spheres of nuclear fuel material of between 0.16 mm to 5 mm diameter in the same liquid as that ejected from the main jet 30, although it will be understood that dissimilar liquids may be used.

Figure 4:
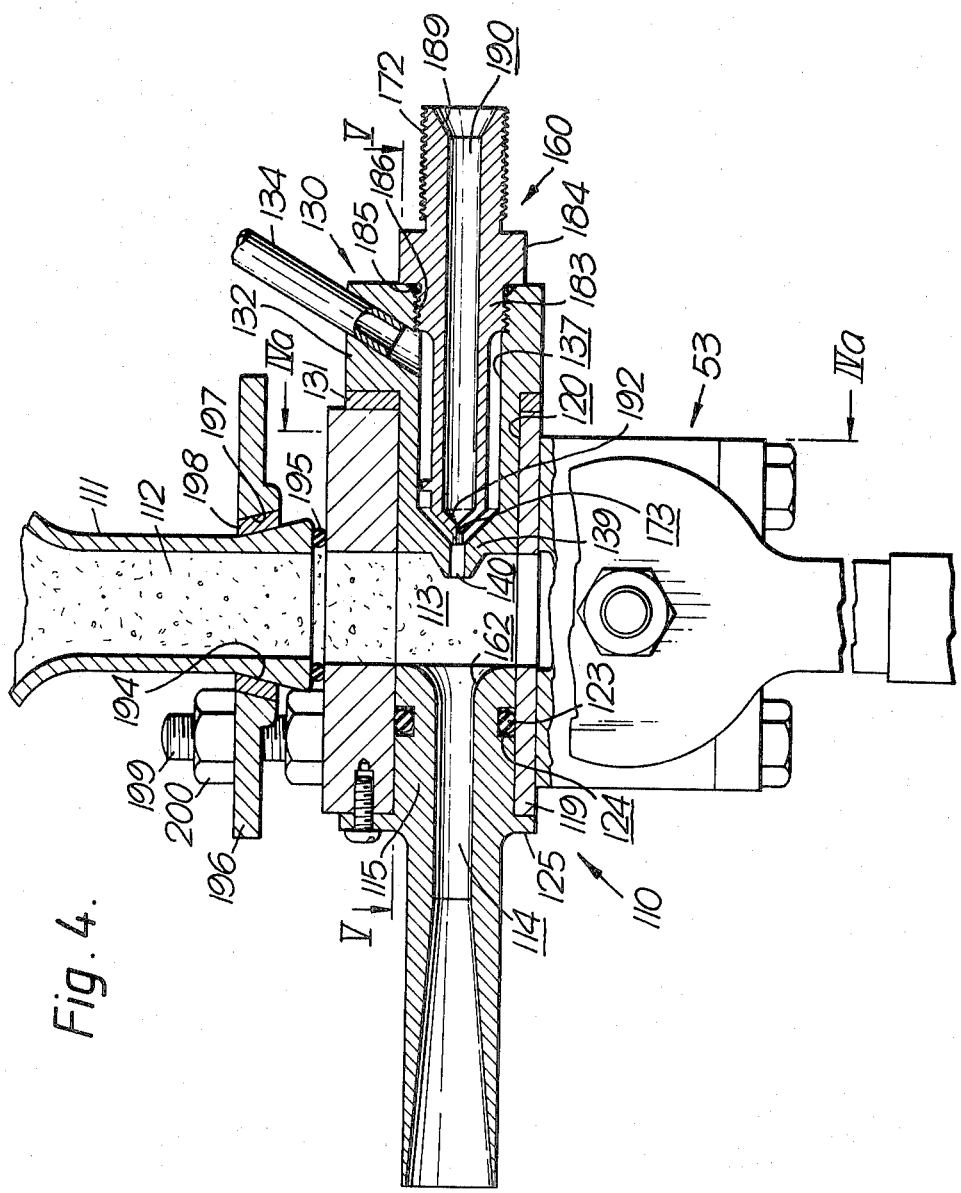
FIG. 4 shows in part-medial section a side view of an ejector of alternative form to that of FIG. 2.
Figure 5:
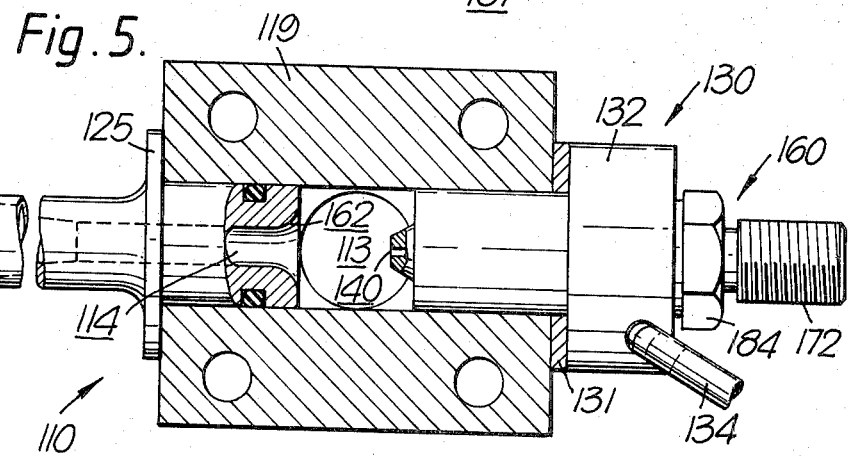
FIG. 5 shows a sectional view on the line V—V of FIG. 4.

As an alternative to the use of a secondary jet aligned angularly with respect to the main jet, the secondary jet may be co-axial with the main jet as shown in FIGS. 4 and 5 to which reference is made. In FIGS. 4 and 5, an ejector 110 is shown which is similar in some respects to the ejector 10 of FIGS. 1 to 3 in having a throat 113 for the downward feed therein of a slurry 112 from a reservoir 111. The throat 113 connects with an outlet bore 114 having a flared inlet 162 in a body 115 secured by a flange 125 to a housing 119 of the ejector 110. An 'O' ring seal 123 located in an annular groove 124 is in sealing engagement with the housing 119. A main jet assembly 130 extends through a cylindrical hole 120 in the housing 119 and has a shouldered portion 132 which compresses a sealing gasket 131 when the main jet assembly 130 is secured by screws (not shown) to the housing 119. A feed tube 134 extends obliquely through the shouldered portion 132, and an inner end 139 of the main jet assembly 130 extending into the throat 113 is convergent to define an orifice 140.

Figure 4A:
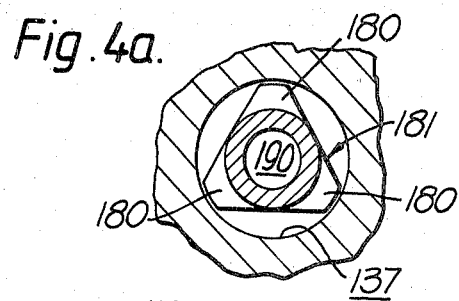
FIG. 4a shows to an enlarged scale a fragmentary sectional view on the line IVa—IVa of FIG. 4.

A secondary jet member 160 extends longitudinally inside a bore 137 of the main jet assembly 130 and is supported co-axially therein as shown in FIG. 4a by three equi-spaced lobes 180 of a triangular shaped spacer 181. Referring again to FIGS. 4 and 5, a threaded boss portion 183 extending from a hexagonal shaped flange 184 of the secondary jet member 160 provides a seating for an 'O' ring seal 185 which butts against the shouldered portion 132 when the threaded portion 183 is tightened in a mating threaded portion 186 of the shouldered portion 132. A threaded spigot 172 extends outwardly from the hexagonal flange 184, and has a conical inlet 189 to an axial bore 190 which extends through the secondary jet member 160, the bore 190 having a converging end 192 which defines an orifice 173. The spacing between the converging end 192 and the inner end 139 of the main jet assembly 130 is intermediate the cross-sectional areas of the aperture 140 and the annular space defined by the secondary member 160 in the bore 137.

The reservoir 111 is constructed of glass and has an outer diverging end surface 194, and sits on a polytetrafluoroethylene (PTFE) gasket ring 195. In a conventional manner, a flange 196 having an enlarged tapered bore 197 is fitted about the end surface 194, the space between the end surface 194 and the bore 197 being filled by a fibre insert 198. Several studs 199 (only one is shown) extend from the housing 119 through the flange 196 which is held downwardly by mating nuts 200 on the studs 199 that hold the reservoir 111 in sealing engagement against the PTFE gasket ring 195. A ball drain valve 53 is fitted at the opposite end of the throat 113 from that of the reservoir 111.

The ejector 110 of FIGS. 4 and 5 operates in a similar manner to that described in relation to FIGS. 1 to 3. A clear fluid is introduced from a supply (not shown) into the feed tube 134 and is ejected at a low pressure of about 10 to 20 psi through the orifice 140 into the inlet 162 of the outlet bore 114 and entrains some of the slurry 112 from the reservoir 111 as the fluid passes through the throat 113. In the event of material from the slurry 112 lodging in the flared inlet 162, a clear liquid is fed at a high pressure (e.g. 2000 psi) from a supply (not shown) through the axial bore 190 of the secondary jet member 160 and is ejected from the orifice 173 to break up and/or dislodge the material.

Figure 6:
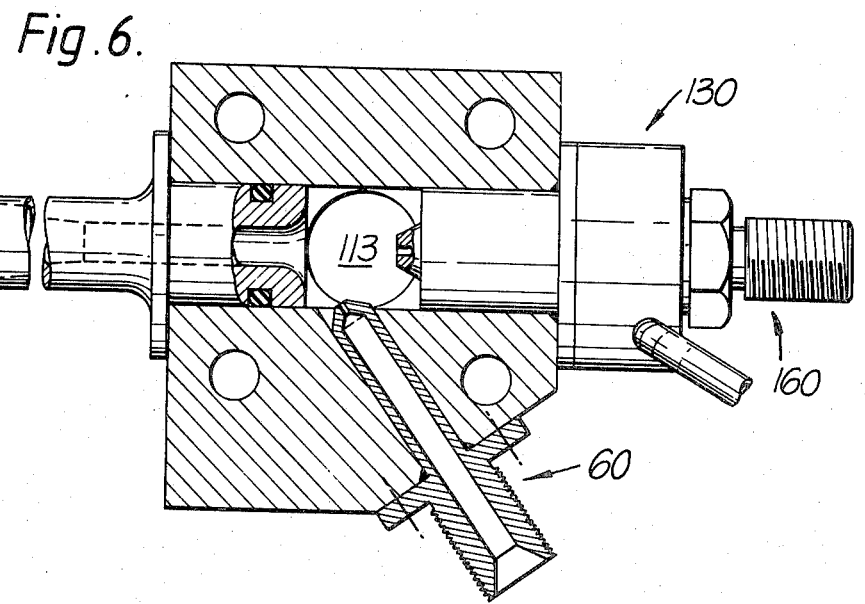
FIG. 6 shows a modified form of the ejector of FIG. 5

It will be appreciated as shown in FIG. 6, that if desired an ejector may incorporate both an angularly disposed secondary jet tube 60, and a secondary jet member 160 co-axially disposed with respect to a main assembly 130.

An ejector 10, 110 might have a throat 13, 113 of about 18 mm minimum diameter, a main jet orifice 40, 140 of between 1 to 2 mm diameter, a secondary jet orifice 73, 173 of about 0.4 mm diameter, and an outlet bore 14, 114 of about 7 mm diameter.

The slurry 12, 112 may comprise gel spheres comprising nuclear material of between 0.16 to 5 mm diameter, and usually the clear liquid to be ejected from the main jet orifice 40, 140 will be identical to that of the slurry 12, 112 (e.g. aqueous ammonia solution, water, or alcohol), although dissimilar liquids may be used.

An advantage of the ejector of FIGS. 4 and 5 is that the secondary jet assembly 173 may be used to break up and/or dislodge any material which might be blocking the main jet orifice 40, 140.

It will be understood that the ejector of the invention may be operated at alternative pressures to those aforementioned, and determined by the particular application.

We claim:
1. An ejector comprising,
   (a) a body defining both a cylindrical bore therethrough and a cylindrical throat therethrough normal to the bore;
   (b) an outlet member having a cylindrical portion thereof sealingly located inside one of the ends of the bores and extending to the throat, and having a co-axially extending aperture therethrough to provide an outlet from the throat;
   (c) a first nozzle member having a cylindrical portion thereof sealingly located inside the other end of the bore and extending to the throat, the first nozzle member defining a co-axially extending cylindrical chamber therein with at one end thereof a frusto-conical end portion converging to a relatively narrow cylindrical orifice which connects the chamber to the throat, the other end of the chamber defining an internal screw thread, and an inlet being defined through the side of the first nozzle member for connecting the chamber to a supply of liquid at a relatively low pressure;
   (d) a second nozzle member partially disposed inside the chamber, the second nozzle member comprising a cylindrical body portion sealingly located in the chamber, the body portion having several lobes radially extending to the inside surface of the chamber so as to locate the body portion co-axially with the chamber and define a hollow cylindrical space therebetween, the body portion defining an external screw thread engaged with the internal screw thread of the first nozzle member, and the second nozzle member defining a co-axially extending cylindrical duct therein having at one end thereof a frusto-conical end portion which converges to a cylindrical hole that connects the duct to the chamber adjacent to the orifice of the first nozzle member, the hole being smaller in diameter than said orifice, and the second nozzle member having an externally threaded spigot portion extending from the body portion for connecting the second nozzle member to a supply of a liquid at a relatively high pressure;
   (e) a shut-off valve at one end of the throat, and
   (f) a reservoir connected to the body at the other end of the throat for directing, in operating, a downward feed of a slurry in the reservoir into the throat,
whereby, in use of the ejector intermittent operation of the second nozzle member in issuing the relatively high pressure liquid therefrom, dislodges any material from the slurry lodging in or adjacent to the outlet.

2. An ejector as claimed in claim 1, wherein the second nozzle member has a said hole for the issuance of the relatively high pressure liquid therefrom of about 0.4 mm diameter.

3. An ejector as claimed in claim 1, wherein there is provided a third nozzle member which is angularly disposed from the first nozzle member, for issuing the relatively high pressure liquid through said throat portion at said outlet.

* * * * *